United States Patent [19]
Pennings et al.

[11] 3,883,670
[45] May 13, 1975

[54] POURABLE CREAM CONCENTRATE

[75] Inventors: Henricus Jacobus Pennings, Beijerland, Netherlands; Norbert Herendi, Delmenhorst, Germany

[73] Assignee: Lever Brothers Company, New York, N.Y.

[22] Filed: Dec. 7, 1973

[21] Appl. No.: 423,372

[52] U.S. Cl. ............... 426/568; 426/570; 426/585; 426/605; 426/613; 426/611
[51] Int. Cl. .............................................. A23d 5/00
[58] Field of Search ........... 426/151, 165, 195, 196, 426/201, 216, 189, 202, 359, 363

[56] References Cited
UNITED STATES PATENTS
2,786,765   3/1957   Prince ............................ 426/363 X

*Primary Examiner*—Raymond N. Jones
*Assistant Examiner*—R. A. Yoncoskie
*Attorney, Agent, or Firm*—Lever Brothers Company

[57] ABSTRACT

The specification describes a pourable cream concentrate containing fat, α-monoglycerides, egg yolk, sugar and polyalcohols; this cream concentrate remains microbiologically stable for about 6 weeks when stored at ambient temperature. Optimally vegetable phosphatides, egg white and a stabiliser can be present in the cream concentrate of the invention. The cream concentrate can be diluted, e.g. with milk, to provide a cream which — when whipped — has a specific volume of more than 2 and a good "stand-up."

9 Claims, No Drawings

POURABLE CREAM CONCENTRATE

The present invention relates to a cream concentrate, a cream prepared therefrom and to a process for preparing the cream concentrate.

The invention particularly relates to a cream concentrate which is pourable for at least several weeks, e.g. 6 weeks, which remains microbiologically stable for the same period even when stored at ambient temperature, e.g. 20°C, and from which preferably by dilution a whippable filled cream can be prepared, and to a process for preparing such a concentrate. The cream whip of the invention has a specific volume of more than 2, especially 2.2 to 3.0, more particularly 2.5 to 2.8 ml/gram.

Conventional cream concentrates often are or become plastic at ambient temperature when stored for some time and/or inadequate in respect of one or more of the following characteristics: microbiological stability, whippability of the cream prepared therefrom and hold-up of the cream whip and taste.

In this specification by "a cream concentrate" is meant an oil-in-water emulsion containing a substantial proportion of vegetable fat, which emulsion — especially when mixed with a suitable proportion of water and/or milk, skim milk or similar aqueous protein containing phase — can be used as a cream of the required fat content, which cream can subsequently be whipped to provide the cream whip.

THE PRIOR ART

Egg yolk containing oil-in-water emulsions are disclosed in Belgian Patent Specification No. 632,923, British Patent Specification Nos. 357,246 and 334,863.

The creams disclosed in these old references are as regards one or more of the properties such as pourability, microbiological stability at ambient temperature, specific volume after whipping and "stand-up" of the whip, inferior to the products of the instant invention.

In Irish Patent Application No. 483/66 cream concentrates are disclosed containing fat, sugar, emulsifying agents and stabilizers.

Such concentrates, however, are free from egg yolk and consequently a whip prepared from such a cream concentrate lacks the soft creamy taste and texture of a whip prepared from the products of the instant invention.

The inherent microbiological problems of egg yolk containing oil-in-water emulsions are the reason why nowadays the emulsions, when sold as such, do not contain egg yolk or vice versa are spray-dried when they contain egg yolk.

By a critical selection of ingredients the pourable products of the invention, which contain egg yolk, are microbiologically stable at ambient temperature, even without having been sterilized, and provide a suitable basis for an excellently tasting cream whip of a high specific volume and a good stand-up.

The dilatation values of the fat or fat blend as described in this specification were determined by the method described in Boekenoogen "Analysis and Characterization of Oils, Fats and Fat Products," Vol. I 1964, Interscience Publishers, London pp. 143 et seq..

Preferably monoglycerides are used which are substantially completely saturated e.g. monoglycerides from substantially completely hydrogenated fats e.g. palm oil of a melting point of about 58°C, sunflower oil of a melting point of about 67°C or rapeseed oil of a melting point of about 70°C, or monoglycerides of saturated fatty acids, e.g. with 14 and 16 carbon atoms; the latter monoglycerides can e.g. be prepared by synthesis. It can be advantageous to use those monoglycerides which upon crystallisation of the selected fat blend will provide a percentage of solid fat at 20°C of at least 10 percent of the fat content in the emulsion, preferably at least 15 percent, e.g. after tempering the emulsion for 24 hours at 8°C and 24 hours at 20°C.

The product of the invention preferably also comprises at least 5 percent by weight of sugars, the upper limit of the sugar concentration being determined by the solubility of the sugar in the aqueous phase of the filled cream concentrate. Suitable sugars are e.g. saccharose, dextrose, lactose, fructose etc., which sugars are preferably applied in a concentration of 8–20 percent by weight (calculated on the emulsion).

The product of the invention preferably also comprises 5–15 percent, especially 8–12 percent by weight of polyalcohols e.g. glycerol, mannitol and particularly sorbitol. It is particularly preferred that both sugars and polyalcohols are present in the product of the invention, e.g. in an amount of at least 1.75 mol/kg aqueous phase, preferably from 1.95 to 3.00 mol/kg aqueous phase, since at these concentrations of sugars and polyalcohols the products are microbiologically stable for at least several weeks when stored at temperatures of about 20°C. Apart from a favourable influence of the polyalcohols on the microbiological stability of the cream concentrate, they further exert a surprisingly positive influence on the viscosity of the product.

Products containing a sufficient amount of polyalcohols have an almost constant viscosity at temperatures varying from 5°–20°C, whereas identical products which do not contain such additives can be pourable at 20°C and plastic at 5°C.

In this specification in calculating the molar concentration of sugars and polyalcohols in the aqueous phase, the molecular weight of the saccharose is multiplied by 2 and that of other sugars and polyalcohols by 1, since it has been observed that saccharose has a more pronounced influence on the microbiological stability than other sugars and polyalcohols.

The cream concentrate of the invention can contain up to 6 percent of vegetable phosphatides, particularly no less than 0.1 percent and especially preferred no more than 1.5 percent. The phosphatides are particularly advantageous at the lower egg yolk levels. Roughly about 0.3 percent of phosphatides are required to decrease the egg yolk content from about 4.5 to 3.5 percent.

The aqueous phase of the cream concentrate should contain a substantial proportion of water which in turn can be derived from milk or milk products. Alternatively the aqueous phase can consist of water or a mixture of water and dried milk products, e.g. dried skim milk or full fat milk powder, etc.

The phosphatide which can be used for the purpose of the invention can be a phosphatide slime obtained in the production of vegetable oils, e.g. soybean or rapeseed oil by steam or water treatment of the extracted oils at e.g. 95°–100°C. Crude phosphatides can also be obtained by centrifuging such a phosphatide slime and drying the product under reduced pressure. A typical phosphatide which can thus be obtained contains about 20–40 percent of oil and 80–60 percent of diacylglycerophosphatides. It is particularly preferred to use vegetable phosphatides which contain monoacylglycerophosphatides which lack either the α- or β-acyl groups of the diacylglycerophosphatides. Typical of them are α- and β-lysolecithin and α- and β-lysocephalin. Monoacylglycerophosphatides can be prepared by synthesis or they can be obtained by chemical hydrolysis (see e.g. British Patent Application No. 18163/68) or enzymatic hydrolysis (see e.g. British Patent Application No. 42,968/70). The partial hydrolysed phosphatides which are particularly preferred in the product of the invention contain 5–35 percent by weight of monoacylglycerophosphatides.

Proteins, especially egg whites, which can have a beneficial effect on the pourability of the cream concentrates of the invention, especially those of high fat contents, can be present in a proportion of 0–5 percent by weight, preferably 0.5 to 3 or 3.5 percent.

To improve the hold-up of the cream whip prepared from the products of the invention it is sometimes advisable to add a small proportion, e.g. up to about 1 percent by weight, of a stabiliser, e.g. a vegetable gum. Particularly suitable proportions are e.g. 0.01 to 0.3 percent, particularly 0.025 to 0.035 percent by weight of the emulsion. For consistency reasons it is sometimes advantageous to incorporate small proportions of soap and/or fatty acids in the product of the invention, e.g. 0.1 to 1 percent.

The cream concentrate of the invention can be diluted with sufficient additional aqueous phase, e.g. water, milk or skim milk to provide a cream of a fat content of 25–35 percent. This cream can be whipped by conventional means to provide a cream whip of the desired specific volume.

The invention also relates to a process for preparing a filled cream concentrate which comprises emulsifying a blend comprising fat, monoglycerides, egg yolk and an aqueous phase at a temperature above the melting point of the fat and subsequently, homogenizing, pasteurising, cooling, homogenizing cooling and aseptic filling the emulsion obtained. The homogenizing treatment should preferably be carried out such that the majority, preferably at least 90 percent, of the dispersed fat particles have a particle size below 10μ, particularly from 1–3μ, since the better the partition of the fat particles the better the hold-up of the cream whip.

Care should be taken that the cream concentrate is adequately tempered, e.g. by storage at 5°–10°C for at least 10 hours, preferably 12–48 hours.

The invention will now be illustrated by the following Examples.

EXAMPLE I

A cream concentrate was prepared from the following ingredients:

| | weight % |
|---|---|
| a fat blend of a $D_{20}$ of 500 consisting of 35 parts by weight sunflower oil, 15 parts by weight coconut-oil, 35 parts by weight partically hydrogenated soyabean oil of a slip melting point at 36°C, 15 parts by weight hydrogenated palm-oil of a melting point of 42°C. | 44.30 |
| Monoglycerides of saturated $C_{16}$ and $C_{18}$ fatty acids (% α-monoglycerides 90%) | 0.32 |
| Lecithin (containing 35% of oil) | 0.30 |
| Carraghenan | 0.03 |
| Sorbitol ) | 8.40 |
| 1.92 mol/kg aqueous phase | |

-Continued

| | weight % |
|---|---|
| Saccharose ) | 10.00 |
| Egg yolk | 3.45 |
| Egg white | 2.50 |
| Water | 30.70 |

The product was prepared from a pre-emulsion containing the above ingredients, which pre-emulsion was prepared as follows:

The fat was heated to 70°C and mixed with the monoglycerides and the lecithin, and subsequently cooled to 50°C.

Water was mixed with the sorbitol, saccharose and stabiliser at 50°C. To this aqueous phase egg yolk and egg white were added and after thorough mixing the fat phase was dispersed therein, using an Ultra Turrax stirrer.

The pre-emulsion of a temperature of 50°C was subsequently homogenised at 70 atmospheres in a "Knollenberg" high-pressure homogenizer BE 400–1200/200; 10–370; pasteurised for 26 seconds at 85°C in a plate heat exchanger, cooled to 45°C in the same plate heat exchanger, homogenised at 40 atmospheres in another Knollenberg high-pressure homogenizer as described before, cooled to 20°C in the plate heat exchanger and aseptically filled.

The product obtained had an excellent taste and was excellently pourable, and microbiologically stable after 6 weeks storage at 20°C. The cream concentrate was, after 6 weeks storage, diluted with milk to a fat content of 30 percent and whipped using a Hobart whipping machine CE 100 to provide a cream whip of a specific volume of 2.6 ml/gram. The stand-up had not changed after 8 hours storage at 20°C.

EXAMPLE II

Example I was repeated except that now 0.2 percent of monoglycerides were used and 30.82 percent water. The characteristics of the cream concentrate obtained were identical to those of the product of Example I except that the product was somewhat less viscous. The specific volume of the cream whip was 2.4 ml/gram.

The stand-up did not change during 8 hours storage of the whip at 20°C.

EXAMPLE III

Example I was repeated except that the following percentages of ingredients were used:

| | |
|---|---|
| fat | 39.0 |
| monoglycerides | 0.3 |
| (% α-monoglycerides 80%0 | |
| stabiliser | 0.03 |
| sorbitol | 11.4 |
| saccharose | 10.0 |
| egg yolk | 3.45 |
| egg white | 2.40 |
| water | 33.42 |

In comparison with the product of Example I, this cream concentrate was less viscous.

A cream whip prepared from the filled cream obtained by diluting this product with milk to a fat content of 30 percent had a specific volume of 2.65 ml/gram. The stand-up was maintained during 8 hours storage of the whip at 20°C.

EXAMPLE IV

Example III was repeated, except that the egg white was replaced by water. The characteristics of the cream obtained were similar to those of Example III, except that the product was slightly more viscous. The specific volume of the whip prepared after dilution of the product with milk to 30 percent fat was 2.6 ml/gram; this specific volume could, however, easily be decreased to unacceptable values if the product was whipped for too long a period. The stand-up of the whip was maintained during 8 hours storage at 20°C.

EXAMPLE V

Example IV was repeated except that the following percentages of ingredients were used:

| | |
|---|---|
| fat | 47.3% |
| monoglycerides | 0.3 |
| stabiliser | 0.03 |
| sorbitol | 9.22 |
| saccharose | 10.0 |
| egg yolk | 3.45 |
| water | remainder |

In comparison with the product of Example IV this cream concentrate was more viscous at 20°C and just pourable at 5°C.

The characteristics of the whip prepared from a 30 percent fat containing cream were identical to those of the whip of Example IV.

EXAMPLE VI

Example I was repeated except that the lecithin was replaced by a partly hydrolysed lecithin containing about 20 percent of monoacylglycerophosphatides. The product was appreciably less viscous; the stand-up of the whip was maintained for about 4 to 5 hours at 20°C.

EXAMPLE VII

Example I was repeated except that 37 percent by weight of fat blend of a $D_{20}$ value of 320 and 1.5 percent of egg yolk, 8.5 percent of dextrose, 6.0 percent of mannitol and 0.9 percent of soyabean lecithin were used; the water content was correspondingly adjusted.

A cream concentrate of acceptable properties was obtained.

EXAMPLE VIII

Example I was repeated except that 48.0 percent of a fat blend of a $D_{20}$ value of 380, 5 percent of egg yolk, 1.3 percent of monoglycerides (calculated as α-monoglycerides), 9.5 percent of lactose, 10 percent of saccharose and 13 percent of glycerol were used; the water content was correspondingly adjusted.

A cream concentrate of acdeptable properties was obtained.

EXAMPLE IX

Similarly as in Example I a cream concentrate was prepared. The following ingredients were used:

| | |
|---|---|
| Sunflower oil | 34.50 |
| Hydrogenated palm kernel oil (m.p. 39°C) | 8.00 |
| Interesterified blend of 50% of palm kernel oil (m.p. 39°C) and 50% palm oil (m.p. 58°C) | 3.50 |
| Monoglycerides of fully hydrogenated palm oil of a melting point of 58°C (α-mono content 35%) | 0.64 |

-Continued

| | |
|---|---|
| Lecithin | 0.30 |
| Carraghenan | 0.03 |
| Saccharose | 3.10 |
| Dextrose | 12.75 |
| Sorbitol | 9.00 |
| Egg yolk | 3.45 |
| Egg white | 1.20 |
| Water | 23.53 |
| | 100.00 |

The emulsion was stored in the refrigerator at 6°C for 20 hours, diluted with cold milk (175 gram milk per 400 g filled cream concentrate) and whipped in a Hobart machine at the highest speed.

After 3–5 minutes whipping a good stand-up and a specific volume of about 2.2 ml/gram were obtained.

What is claimed is:

1. Pourable cream concentrate comprising by weight: 35–50 percent of fat of a dilatation value at 20°C of at least 200; 0.1–1.5 percent of α-monoglycerides; 1–6 percent of egg yolk; at least 5 percent of sugar, the upper limit being determined by the solubility of the sugar in the aqueous phase; 5–15 percent of polyalcohols selected from the group consisting of glycerol, mannitol and sorbitol; 0–6 percent of vegetable phosphatides; 0–5 percent of egg white; 0–1 percent of stabilizer; the balance being an aqueous phase.

2. Pourable cream concentrate consisting essentially of: 35–50 percent of fat of a dilatation value at 20°C of at least 200; 0.1–1.5 percent of α-monoglycerides; 1–6 percent of egg yolk; 8–20 percent of sugar selected from the group consisting of saccharose, dextrose, lactrose and fructrose; 5–15 percent of poly-alcohols selected from the group consisting of glycerol, mannitol and sorbitol; 0–6 percent of vegetable phosphatides; 0–5 percent of egg white; 0–1 percent of stabilizer; the balance being an aqueous phase.

3. Pourable cream concentrate consisting essentially of: 35–50 percent of fat of a dilatation value at 20°C of at least 200; 0.1–1.5 percent of α-monoglycerides; 1–6 percent of egg yolk; 8–20 percent of sugar selected from the group consisting of saccharose, dextrose, lactrose and fructrose; 5–15 percent of polyalcohols selected from the group consisting of glycerol, mannitol and sorbitol; 0.1–1.5 percent of vegetable phosphatides; 0.5–3.5 percent of egg white; 0.01–0.3 percent of stabilizer; the balance being an aqueous phase.

4. Cream concentrate according to claim 1, in which the monoglycerides are substantially completely saturated.

5. Cream concentrate according to claim 1, wherein the polyalcohol is sorbitol.

6. Cream concentrate according to claim 5, wherein the sorbitol content is 8–12 percent.

7. Cream concentrate according to claim 1, which contains sugars and polyalcohols in an amount of at least 1.75 mol/kg aqueous phase.

8. Cream which consists of a composition as claimed in claim 1 and sufficient additional aqueous phase to provide from 25 to 35 percent of fat.

9. Cream according to claim 8, in which the additional aqueous phase comprises milk.

* * * * *